United States Patent [19]
Yang et al.

[11] 4,083,018
[45] Apr. 4, 1978

[54] TUNABLE LASER SYSTEM

[75] Inventors: Kei-Hsiung Yang, Schenectady; John A. De Luca, Scotia, both of N.Y.

[73] Assignee: General Electric Company, Schenectady, N.Y.

[21] Appl. No.: 703,093

[22] Filed: Jul. 6, 1976

[51] Int. Cl.² ............................................. H01S 3/16
[52] U.S. Cl. .......................... 331/94.5 F; 331/94.5 C
[58] Field of Search ..................... 331/94.5 F; 330/4.3

[56] References Cited
U.S. PATENT DOCUMENTS

| | | | |
|---|---|---|---|
| 3,233,189 | 2/1966 | Guggenheim et al. | 331/94.5 F |
| 3,833,805 | 9/1974 | Naiman et al. | 331/94.5 F |
| 3,972,007 | 7/1976 | Naiman et al. | 331/94.5 F |

FOREIGN PATENT DOCUMENTS 984,590   2/1965   United Kingdom ................ 331/94.5

*Primary Examiner*—William L. Sikes
*Attorney, Agent, or Firm*—Geoffrey H. Krauss; Joseph T. Cohen; Jerome C. Squillaro

[57] ABSTRACT

A tunable laser system emitting coherent radiation selectively variable over the range of wavelengths from about 1650 A to about 3300 A utilizes a crystal, composed of a fluoride of at least a Column IIIb metal doped with at least one trivalent ion of a lanthanide series element, and pumped with high average power pulses. The crystal is emplaced in an optical cavity having means, such as a diffraction grating, etalon, or optically-tunable prism, to vary the coherent emission wavelength.

21 Claims, 4 Drawing Figures

TUNABLE LASER SYSTEM

BACKGROUND OF THE INVENTION

The present invention relates to laser systems and, more particularly, to a novel tunable laser system emitting coherent radiation in the vacuum-ultraviolet and ultraviolet regions of the electromagnetic spectrum, with wavelengths from about 1650 A to about 3300 A.

There is presently considerable interest in laser systems emitting coherent radiation in the vacuum-ultraviolet (VUV) region of the electromagnetic spectrum and particularly in a tunable VUV emitting laser system. Lasers emitting in the visible and infrared regions are well known, as are tunable coherent sources, such as dye lasers and the like, which are limited to the wavelength region from about 4000 A to about 1 micron. Production of coherent radiation at wavelengths considerably shorter than the above-mentioned 4000 A region is particularly desirable, due to the potential for the photon in the 1650 A to 3300 A region reacting strongly with biological tissues, whereby self-coagulating incisions and destruction of malignant tissue at potentially-inoperable sites may be eventually achieved.

BRIEF SUMMARY OF THE INVENTION

In accordance with the invention, a tunable laser system emitting coherent radiation from about 1650 A to about 3300 A comprises a single lattice crystal of a fluoride of at least a column IIIb metal doped with activator ions of at least one of the lanthanide-series elements. The crystal is pumped by a source of energy having an output wavelength in the region of 1600 A and an output power sufficient to achieve a high power density, at the surface of the crystal, on the order of $10^6$ watts/cm$^2$. The crystal, of a material chosen from a variety of materials each fluorescing over a portion of the total range of output wavelengths, is positioned between a partly transmissive mirror and optical tuning means, such as a rotatable diffraction grating, an etalon, a prism and rotatable fully reflective mirror and the like.

Single frequency VUV wavelength coherent operation is possible solely with the crystal (without an optical system); the coherent radiation being emitted at the peak wavelength of the fluorescence spectrum of the crystal material.

Suitable dopants include cerium, praesodymium, neodymium, erbium and thulium.

Accordingly, it is an object of the present invention to provide a tunable laser system emitting coherent radiation over the spectrum from about 1650 A to about 3300 A.

It is another object of the present invention to provide a non-tunable laser system emitting coherent radiation at a selected one of a plurality of possible wavelengths in the VUV portion of the electromagnetic spectrum, the laser system operating without an optical cavity or additional optical elements.

These and other objects of the present invention will become clear to those skilled in the art upon consideration of the following detailed description and the drawings.

DETAILED DESCRIPTION OF THE INVENTION

Figure 1:
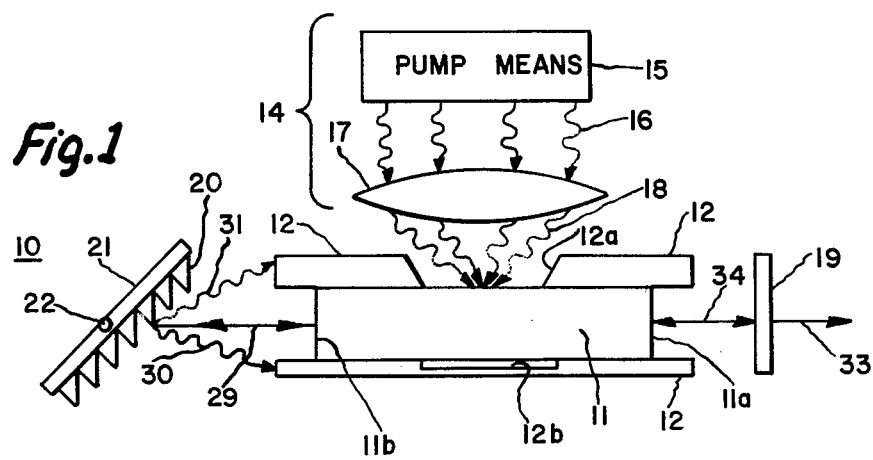
FIG. 1 is a schematic illustration of one preferred embodiment of a tunable VUV laser system in accordance with the principles of the present invention.

Referring initially to FIG. 1, tunable laser system 10 comprises a single lattice crystal 11, of good optical quality, of a material emitting a broad fluorescence output spectrum over at least a portion of the wavelength range between about 1650 A and about 3300 A. Advantageously, crystal 11 is radially encased in heat sink means 12, having high thermal conductivity, to allow transmission of heat from lasing crystal 11 to the ambient environment. Excitation means 14, in one preferred embodiment, comprises pump means 15, such as the molecular hydrogen laser described by Waynant et al. in 17 *App. Phys. Letters* 383 (1970) and the like, emitting radiation 16 having wavelengths in the region of about 1600 A, and lens means 17 for converging a beam of radiation 18 upon the surface of lasing crystal 11. A molecular hydrogen laser 15 is particularly advantageous in that the pumping power available, on the order of $10^5$ watts of pulsed power, may easily be focussed to provide a surface pumping level of about $10^6$ watt/cm.$^2$, as required for crystal materials more fully set forth hereinbelow. It should be understood that excitation means 14 can emit an electron beam or synchotron radiation, with suitable means being utilized to focus the pumping energy onto crystal 11.

A partially transmissive-partially reflective mirror 19 is positioned with its surfaces essentially parallel to the plane of a first crystal end surface 11a, while a diffraction grating 20 maintained on a holding member 21 which is rotatable about a pivot means 22, positioned along the central optical axis of crystal 11, is positioned spaced from the remaining crystal end surface 11b. Both end surfaces 11a and 11b may be fabricated at the Brewster angle, with respect to the central optical axis of crystal 11, to reduce reflection losses.

Figure 2:
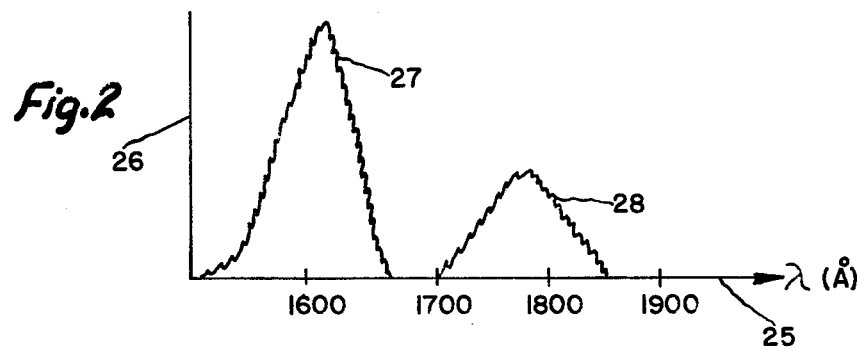
FIG. 2 is a graph illustrating the intensity-wavelength relationship between the fluorescence spectra of one material usable for the crystal of the tunable laser system of the present invention and of the excitation spectrum therefor.

We have found that appropriate materials for lasing crystal 11 comprise a group of activated fluorides of at least a column IIIb element, wherein the crystal lattice, which may advantageously be grown by the Czochralski method (in an atmosphere of helium and hydrogen fluoride), includes at least one species of dopant ions of the lanthanide-series elements: cerium, praesodymium, neodymium, erbium and/or thulium. Referring to FIG. 2, the excitation and emission spectra of one particular material of this group, YF$_3$:0.1% Nd, is shown. Abscissa 25 is scaled in increasing wavelength in angstroms and ordinate 26 is scaled in arbitrary units of intensity. Excitation 27, illustratively being the approximately 10 lines emitted between about 1567 A and about 1613 A by the pulsed output of the aforementioned electron-beam-excited molecular hydrogen laser, causes the electrons of the particular activator ions (neodymium in the present example) to be pumped to the 5d state, which state is highly unstable. The excited electrons revert to the ground state, releasing energy having wavelengths corresponding to the entire range of difference energies between all positions in the 5d level and the ground state. The crystal fluoresces over a broad band 28 of wavelengths (about 1710 A to about 1850 A) with a measured VUV fluorescent quantum yield of about 0.75±0.1 and a fluorescence life time which we estimate to be about 5 nanoseconds.

Advantageously, heat sink 12 is formed of a material having a high transmissivity to the excitation wavelengths, whereby the focussed rays 18 may pass directly through heat sink 12 to pump lasing crystal 11 for emission of fluorescence spectra 28 thereby. Alternatively, a portion 12a of the heat sink may be removed to allow focussed beams 18 to impinge directly upon the surface 15 of crystal 11 and a portion 12b, opposite portion 12a, may be coated with a reflecting material to concentrate beam 18 in the crystal to obtain the required threshold pumping power to achieve a fluorescence spectrum of suitable amplitude for lasing action.

Energy in the broadband fluorescence emission 28 (FIG. 2) is emitted from both end surfaces 11a and 11b of the crystal. The energy emitted from end surface 11b is incident upon diffraction grating 20, at an incident angular orientation relative to the central optical axis of the crystal, adjusted by rotation of diffraction grating 20 and holding member 21 about its pivot means 22, to cause only one of the wavelengths contained in the broad fluorescence spectrum to be reflected by grating 20 and returned along the central optical axis, as shown by photon beam 29. The remaining wavelengths of the broad fluorescence spectrum are returned from diffraction grating 20 as beams 30, 31 having non-zero angular orientation with respect to the central optical axis. As is well known, these beams diverge and are not amplified by repeated transmission through the fluorescing crystal. The partially amplified beam 29 propagates essentially along the central optical axis to emerge from end surface 11a; a portion of the energy emerging therefrom is transmitted through mirror 19 as a beam 33 of coherent radiation, while substantially all of the remainder of the energy is returned in beam 34 to crystal 11 to undergo continued amplification during the fluorescence lifetime of each lasing pulse. Thus, a pulse of coherent radiation, having a wavelength tunably selected (by action of diffraction grating 20) from the broad fluorescence emission spectrum 28 of the material forming crystal 11, is emitted as a beam 33 from laser system 10. It should be understood that, while the present preferred embodiment is illustrated as being a pulsed output laser system, this is only due to the present unavailability of continuous pumping sources at the desired excitation wavelength of about 1600 A; we believe that continuous-wave emission from laser system 10 is possible if a beam of electrons is used as a pumping source or if a continuous excitation means were to be available.

As seen from FIG. 2, only a small portion 28 of the wavelength range 1650 – 3300 A can be tuned with a crystal 11 of a particular material. Crystals of different materials are utilized to extend the tuning range as required; the corresponding tuning ranges for various compounds are listed in the following table:

| APPROXIMATE TUNING RANGE | HOST COMPOUND: ACTIVATOR DOPANT |
| --- | --- |
| ~1650 A ~1720 A | $YF_3$ :Er |
|  | $YF_3$ :Nd |
|  | $LuF_3$ :Er |
| ~1710 A ~1850 A | $LuF_3$ :Tm |
|  | $LiYF_4$ :Er |
|  | $LiYF_4$ :Tm |
|  | $YF_3$ :Nd |
|  | $LuF_3$ :Nd |
| ~1850 A ~1950 A | $LaF_3$ :Nd |
|  | $LiYF_4$ :Nd |
| ~2150 A ~2600 A | $LiYF_4$ :Pr |
| ~2700 A ~3300 A | $YF_3$ :Nd+Ce |
|  | $LaF_3$ :Nd+Ce |
|  | $LuF_3$ :Nd+Ce |
|  | $LiYF_4$ :Nd+Ce |

Crystals of the chosen material for the desired approximate tuning range as grown by known techniques utilizing a phosphor powder of identical chemical composition, prepared as more fully described in our co-pending application Ser. No. 703,094 filed on even data herewith, and incorporated herein by reference. The praesodymium-activated lithium yttrium tetrafluoride, while not described in the aforementioned co-pending application, is formulated as a powder phosphor by identical techniques. It should be understood that other compounds, such as $YPO_4$:Pr, $Y_2(SO_4)_3$:Pr, $BaY_2F_8$:Pr, $BaYF_5$:Pr, $KY_3F_{10}$:Pr, $KYF_4$:Pr and the like, possess the required broadband fluorescence emission spectrum and, if other lanthanide-doped fluorides containing at least a column IIIb element, such as lanthanum, lutetium or yttrium, possess the required broadband fluorescence emission spectrum and, if such materials could be grown as high purity crystals, would be suitable for use in the present invention (the six listed compounds being of the group tunable over the approximate wavelength range of 2250–2600 A). Similarly, while the aforementioned co-pending application does not discuss preparation of the co-doped (neodymium and cerium) materials for the crystals tunable over the approximate wavelength range of 2700–3300 A, preparation of the co-doped powder phosphors of the four listed host materials is disclosed therein and preparation of the initial phosphor materials for growth of the lasing crystal proceed along identical steps. The 2700–3300 A broadband fluorescence spectrum in this last group of materials is attributable to the cerium activator ions, with neodymium ions being present to absorb the VUV excitation energy and facilitate transfer thereof to the cerium ions which then fluoresce in the desired emission range.

Figure 3:
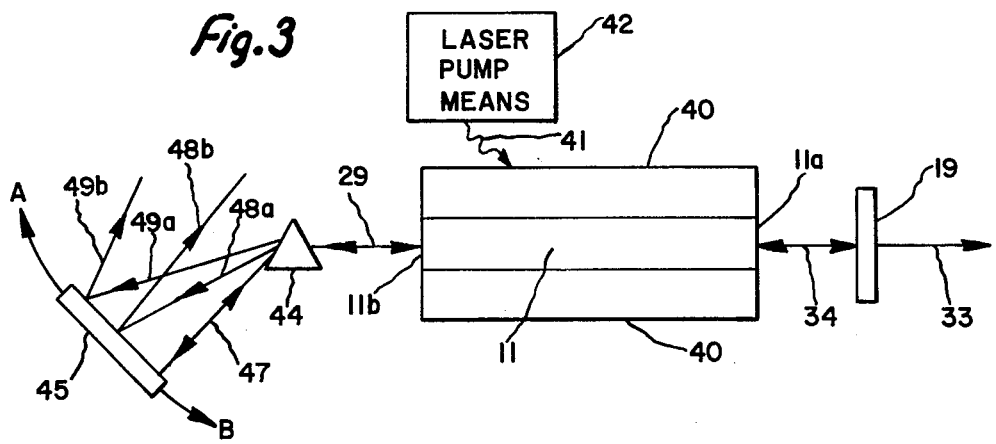
FIG. 3 is a diagram illustrating alternative pumping means and tuning means for the tunable laser system of FIG. 1.

Referring now to FIG. 3, wherein like reference designations are utilized for like elements, several variations in the preferred tunable laser system of FIG. 1 include the use of a cylindrical jacket 40, concentrically formed about lasing crystal 11, containing xenon or other gases capable of being pulse-formed into a plasma responsive to the receipt of pumping energy 41 from a laser pump means 42 (such as the $CO_2$ laser described by Silfvast et al in 25 *App. Phy. Ltrs.* 274 (1975)) to supply the pumping energy to crystal 11. As mentioned hereinabove, the pivotable diffraction grating 20 may be replaced by etalons or by the illustrated fixed prism 44 and fully-reflective mirror 45 selectively rotatable in either radial direction, indicated by arrows A and B, about the center of prism 44. In operation, the fluorescence output of lasing crystal 11 travels along a central optical axis thereof to prism 44 which acts as a wave analyzer imparting different angular rotations (relative to the central optical axis) to photons of differing wavelength, whereby at a selected position of mirror 45, only that beam 47 of a single selected wavelength is returned, via prism 44, to lasing crystal 11 for amplification and emission as coherent beam 33. Other wavelengths, illustratively forming beams 48a and 49a, impinge upon mirror 45, at angles deviating from the normal to the surface of the mirror, and are reflected as beams 48b and 49b, respectively diverging from a central optical axis whereby further amplification and emission of these wavelengths is prevented.

Figure 4:
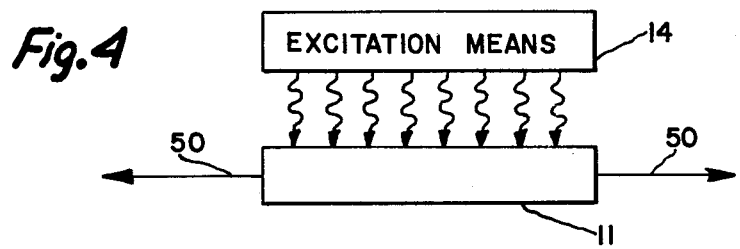
FIG. 4 is a schematic illustration of a non-tunable laser system operation in accordance with the principles of the invention and characterized by operation without optical cavity means.

Referring to FIG. 4, a source of coherent radiation, at a single wavelength equal to the peak wavelength of the phosphor material from which crystal 11 is formed, comprises the crystal 11 operating in a superradient mode as net gain per pass (through the crystal) is greater than one, and its excitation means 14. Thus, optical cavities (as formed by mirror 19 and one of pivotable diffraction grating 20, prism 44-rotatable mirror 45, etalons, or the like) are not required; however, while coherent radiation 50, emitted from both end surfaces 11a and 11b, is produced by use of a material listed in the table (and particularly at VUV wavelengths, i.e., less than about 2000 A, using specific ones of the first 10 materials of the above table), tuning is not possible and the frequency will be that of the peak of the fluorescence emission of the particular host material-activator dopant compound.

While the novel tunable laser system of the present invention has been described with reference to several preferred embodiments thereof, many other variations and modifications will now become apparent to those skilled in the art. It is our intent, therefore, to be limited not by the foregoing disclosure of these preferred embodiments, but only by the appended claims.

What we claim as new and desire to secure by Letters Patent of the United States is:

1. A laser system tunable over one of a plurality of wavelength ranges in the overall wavelength range of about 1650 angstroms to about 3300 angstroms, comprising:
   a crystal of a host material containing the fluoride of at least a column IIIb metal and having the lattice thereof activated by at least one lanthanide-series element;
   excitation means for pumping said crystal with energy having wavelengths of about 1600 A in the vacuum-ultraviolet region of the electromagnetic spectrum to cause said crystal to fluoresce over the selected one of said plurality of wavelength ranges; and
   optical means comprising an optical cavity and including means for selecting a particular wavelength within said selected wavelength range.

2. A system as set forth in claim 1, wherein said optical cavity includes partially-transmissive mirror means spaced from a first end surface of said crystal, said mirror means having a plane thereof essentially transverse to a central optical axis of said crystal; and
   said wavelength selecting means is spaced from an opposite end surface of said crystal for selecting a particular wavelength within said selected wavelength range for reflection along said central optical axis.

3. A system as set forth in claim 2, wherein said wavelength selection means comprises deflection grating means, and pivot means positioned along said central optical axis for facilitating rotation of said deflection grating means at different angular orientations with respect to said central optical axis to select the particular wavelength for reflection along said central optical axis.

4. A system as set forth in claim 2, wherein said wavelength selection means comprises a prism positioned along said central optical axis; and mirror means rotatable about the center of said prism for reflection of a particular wavelength to said crystal.

5. A system as set forth in claim 1, wherein the host material and the element activating the lattice thereof are selected to achieve an approximate tuning range, in accordance with the following table:

TABLE

| Host Material | Activating Element | Approximate Tuning Range |
|---|---|---|
| YF$_3$ | Erbium | 1650 A–1720 A |
| YF$_3$ | Neodymium | 1650 A–1850 A |
| LiYF$_4$ | Thulium | 1650 A–1720 A |
| LiYF$_4$ | Erbium | 1650 A–1720 A |
| LaF$_3$ | Neodymium | 1850 A–1950 A |
| LiYF$_4$ | Neodymium | 1850 A–1950 A |
| LiYF$_4$ | Praesodymium | 2150 A–2600 A |

6. A laser system producing coherent radiation at a single wavelength between about 1650 A and about 3300 A, comprising:
   a crystal of a host material containing of at least a column IIIb metal and having the lattice thereof activated by at least one lanthanide-series element; and
   excitation means for pumping said crystal with energy having wavelengths of about 1600 angstroms in the vacuum-ultraviolet region of the electromagnetic spectrum to cause said crystal to emit photons at a peak wavelength of the fluorescence emission band of said crystal.

7. A system as set forth in claim 6, wherein said material is selected from the group consisting of: YF$_3$:Er, YF$_3$:Nd, LuF$_3$:Er, LuF$_3$:Tm, LiYF$_4$:Er, LiYF$_4$:Tm, YF$_3$:Nd, LuF$_3$:Nd, LaF$_3$:Nd, LiYF$_4$:Nd, LiYF$_4$:Pr, YF$_3$:Nd+Ce, LaF$_3$:Nd+Ce, LuF$_3$:Nd+Ce, and LiYF$_4$:Nd+Ce.

8. A system as set forth in claim 6, wherein said excitation means comprises an electron-beam molecular hydrogen laser, and optical means for focussing the output of said laser upon the surface of said crystal.

9. A system as set forth in claim 6, wherein said excitation means comprises a plasma surrounding said crystal for supplying energy to the latter; and laser pump means for exciting said plasma.

10. A laser system tunable over one of a plurality of wavelength ranges in the overall wavelength range from about 1650 angstroms to about 3300 angstroms, comprising:
   a crystal of a host material selected from the following table, said first material having a lattice thereof activated by at least one activating element selected from said table in association with said material;
   excitation means for pumping said crystal with energy having wavelengths in the vacuum-ultraviolet region of the electromagnetic spectrum to cause the crystal to fluoresce over the selected wavelength range listed in said table therefor;

TABLE

| Host Material | Activating Element(s) | Approximate Tuning Range |
|---|---|---|
| LuF$_3$ | Erbium | 1650 A–1720 A |
| LuF$_3$ | Thulium | 1650 A–1750 A |

TABLE-continued

| Host Material | Activating Element(s) | Approximate Tuning Range |
|---|---|---|
| LuF$_3$ | Neodymium | 1710 A-1850 A |
| LuF$_3$ | Neodymium & Cerium | 2700 A-3300 A |
| LaF$_3$ | Neodymium & Cerium | 2700 A-3300 A |
| YF$_3$ | Neodymium & Cerium | 2700 A-3300 A |
| LiYF$_4$ | Neodymium & Cerium | 2700 A-3300 A | and
  optical means comprising an optical cavity and including means for selecting a particular wavelength within said selected wavelength range.

11. A system as set forth in claim 10, wherein said optical cavity includes partially-transmissive mirror means spaced from a first end surface of said crystal, said mirror means having a plane thereof essentially transverse to a central optical axis of said crystal; and
  said wavelength selecting means is spaced from an opposite end surface of said crystal for selecting a particular wavelength within said selected wavelength range for reflection along said central optical axis.

12. A system as set forth in claim 11, wherein said wavelength selection means comprises deflection grating means, and pivot means positioned along said central optical axis for facilitating rotation of said deflection grating means at different angular orientations with respect to said central optical axis to select the particular wavelength for reflection along said central optical axis.

13. A system as set forth in claim 11, wherein said wavelength selection means comprises a prism positioned along said central optical axis; and mirror means rotatable about the center of said prism for reflection of a particular wavelength to said crystal.

14. A laser system tunable over one of a plurality of wavelength ranges in the overall wavelength range of about 1650 angstroms to about 3300 angstroms, comprising:
  a crystal of a host material containing the fluoride of at least a column IIIb metal and having the lattice thereof activated by at least one lanthanide-series element;
  an electron-beam molecular hydrogen laser means for pumping said crystal with energy having wavelengths in the vacuum-ultraviolet region of the electromagnetic spectrum;
  optical means for focusing the output of said laser upon a surface of said crystal to cause said crystal to fluoresce over the selected wavelength range; and
  optical means comprising an optical cavity and including means for selecting a particular wavelength within said selected wavelength range.

15. A system as set forth in claim 14, wherein said optical cavity includes partially-transmissive mirror means spaced from a first end surface of said crystal, said mirror means having a plane thereof essentially transverse to a central optical axis of said crystal; and
  said wavelength selecting means is spaced from an opposite end surface of said crystal for selecting a particular wavelength within said selected wavelength range for reflection along said central optical axis.

16. A system as set forth in claim 15, wherein said wavelength selection means comprises deflection grating means, and pivot means positioned along said central optical axis for facilitating rotation of said deflection grating means at different angular orientations with respect to said central optical axis to select the particular wavelength for reflection along said central optical axis.

17. A system as set forth in claim 15, wherein said wavelength selection means comprises a prism positioned along said central optical axis; and mirror means rotatable about the center of said prism for reflection of a particular wavelength to said crystal.

18. A laser system tunable over one of a plurality of wavelength ranges in the overall wavelength range of about 1650 angstroms to about 3300 angstroms, comprising:
  a crystal of a host material containing the fluoride of at least a column IIIb metal and having the lattice thereof activated by at least one lanthanide-series element;
  a plasma surrounding said crystal for supplying said crystal with energy having wavelengths in the vacuum-ultraviolet region of the electromagnetic spectrum;
  laser pump means for exciting said plasma to cause said crystal to fluoresce over the selected wavelength range; and
  optical means comprising an optical cavity and including means for selecting a particular wavelength within said selected wavelength range.

19. A system as set forth in claim 18, wherein said optical cavity includes partially-transmissive mirror means spaced from a first end surface of said crystal, said mirror means having a plane thereof essentially transverse to a central optical axis of said crystal; and
  said wavelength selecting means is spaced from an opposite end surface of said crystal for selecting a particular wavelength within said selected wavelength range for reflection along said central optical axis.

20. A system as set forth in claim 19, wherein said wavelength selection means comprises deflection grating means, and pivot means positioned along said central optical axis for facilitating rotation of said deflection grating means at different angular orientations with respect to said central optical axis to select the particular wavelength for reflection along said central optical axis.

21. A system as set forth in claim 19, wherein said wavelength selection means comprises a prism positioned along said central optical axis; and mirror means rotatable about the center of said prism for reflection of a particular wavelength to said crystal.

* * * * *